(No Model.)
E. J. BROOKS.
SEAL.
No. 524,675. Patented Aug. 14, 1894.
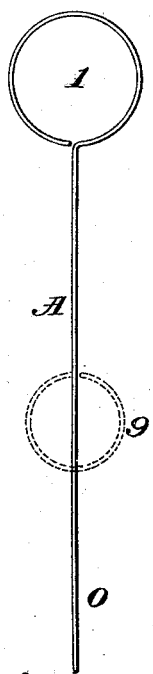
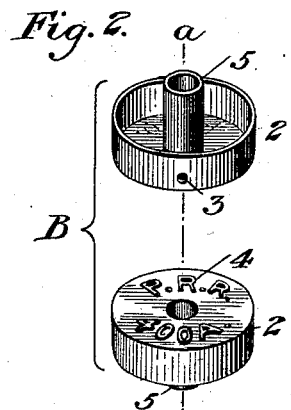
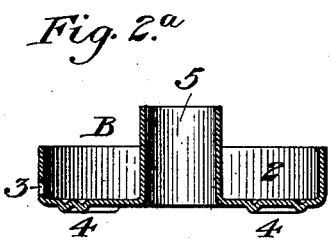
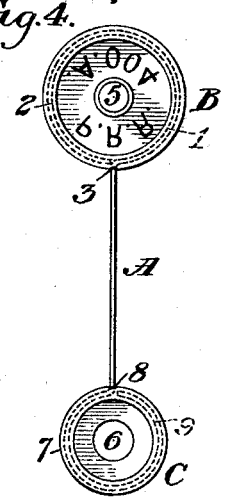
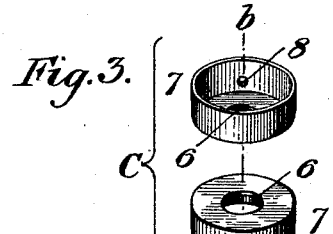
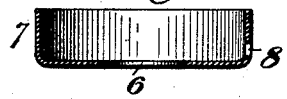
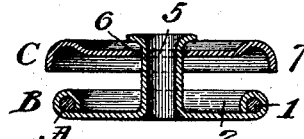
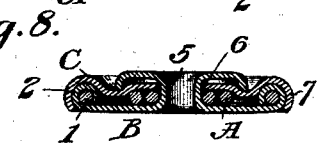
Witnesses
T. A. Connery
Geo. M. Whitney
Inventor
Edward J. Brooks
by
Attorney.

UNITED STATES PATENT OFFICE.

EDWARD J. BROOKS, OF EAST ORANGE, NEW JERSEY, ASSIGNOR TO THE E. J. BROOKS & COMPANY, OF NEW YORK, N. Y.

SEAL.

SPECIFICATION forming part of Letters Patent No. 524,675, dated August 14, 1894.

Application filed May 10, 1894. Serial No. 510,748. (No model.)

*To all whom it may concern:*

Be it known that I, EDWARD J. BROOKS, a citizen of the United States of America, and a resident of East Orange, in the State of New Jersey, have invented a new and useful Improvement in Seals, of which the following is a specification.

This invention relates exclusively to those press-fastened seals in which the shackle is of flexible wire, conveniently and preferably plain as it comes from the wire-mill, and the pressed seal-part is disk-shaped and of suitable sheet-metal. One form of such seals is set forth in my previous specification forming part of United States Letters Patent bearing date May 22, 1894, No. 520,390.

The present invention consists in a novel combination of parts hereinafter set forth and claimed, whereby improved seals are formed which combine security, lightness and inexpensiveness in a superior degree; also in a specific improved seal embodying said combination which comprises a flexible wire-shackle and two annular disk-parts, the seal being fastened by upsetting a central eyelet collar integral with one of said disk-parts, as shown in the accompanying sheet of drawings.

Figure 1 of these drawings rerepsents the shackle of an improved seal; Fig. 2 two perspective views of its principal disk-part; Fig. 2ª a magnified section on the line $a$—$a$ Fig. 2; Fig. 3 two perspective views of its other disk-part; Fig. 3ᵇ a magnified section on the line $b$—$b$ Fig. 3; Fig. 4 the improved seal as completed for the market; Fig. 5 an edge view of the same ready for the seal-press, with an appended section through the sealing staples of a box to which the seal is applied; Fig. 5ᶜ a magnified section on the line $c$—$c$ Fig. 5; Fig. 6 an edge view of the pressed seal with accessories as in Fig. 5; Fig. 6ᵈ a magnified section on the line $d$—$d$ Fig. 6; and Figs. 7 and 8 sections through the seal-part of a modified seal before and after press-fastening.

Like letters and numbers refer to corresponding parts in all the figures.

Each of the improved seals represented by the drawings is composed of a flexible wire-shackle A which is originally formed with a circular loop 1 at one of its ends as represented by the full lines in Fig. 1; a sheet-metal annulus B originally formed with a marginal rim 2 adapted to embrace said loop 1 and provided with a hole 3 through which the straight portion of the shackle A can be drawn, an annular field 4 provided in the shaping dies with the principal distinguishing marks or lettering of the seal in embossed characters, and a central eyelet collar 5 which conveniently projects in the same direction as said rim 2; and a second sheet-metal annulus C having originally a central hole 6 fitted to said eyelet-collar 5, with or without an annular rim or flange 7 having a threading-hole 8 and adapted to embrace and cover a smaller loop 9 of the shackle.

In the improved seal represented by Figs. 1 to 6ᵈ inclusive, after the straight end O Fig. 1 of the shackle A has been threaded through said hole 3 of the annulus B, and said annulus has been wired with said loop 1 of the shackle by means of the rim 2 of said annulus, the flanged annulus C, represented by Figs. 3 and 3ᵇ, is threaded upon the shackle; said smaller loop 9 is then formed by bending said end O as illustrated by dotted lines in Fig. 1, and said loop 9 is then wired with said annulus C to complete the seal for the market, as represented by Fig. 4. After passing the annulus C through a pair of sealing staples D Figs. 5 and 6 or the like, it is loosely interlocked with the eyelet-collar 5 as in Figs. 5 and 5ᶜ, and a suitable eyeleting seal-press is then applied, which permanently closes the seal-disk, and completes the seal as in Figs. 6 and 6ᵈ.

In the modified seal represented by Figs. 7 and 8 the eyelet-collar 5 of the annulus B is preferably elongated, and the annulus C may be made without any marginal rim 7, or preferably with a modified rim as in Figs. 7 and 8 adapted to embrace within it the perimeter of the wired annulus B when the modified seal is press-fastened as in Fig. 8. In this modified seal, the shackle A retains its straight end O until it has been applied to the sealing staples D, so that the latter may be smaller than those required for the seal first described. Instead of preliminarily wiring the annulus C it is preliminarily attached to the extremity of the eyelet-collar 5, as in Fig. 7, by slightly expanding and upsetting the latter; after the shackle is threaded through the sealing staples as above its free end is wrapped one or more times around the eyelet-collar between the two disks formed by the respective annuluses as in what are known as "button-seals;" and when the eyelet-collar 5 is compressed to fasten the seal, as in Fig. 8, such loops of said free end of the shackle are secured between the annulus B and the annulus C as at A in Fig. 8.

Other like modifications will suggest themselves to those skilled in the art.

Having thus described the said improvement, I claim as my invention and desire to patent under this specification—

1. The combination in a press-fastened seal of a flexible wire shackle, a sheet-metal annulus wired with one end of said shackle and having a central eyelet-collar, and a second sheet-metal annulus which coacts with said eyelet-collar to secure the other end of the shackle, substantially as hereinbefore specified.

2. An improved seal composed of a flexible wire shackle having loops of different sizes formed by its respective ends, a sheet-metal annulus wired with the larger of said loops and having a central eyelet-collar, and a second sheet-metal annulus wired with the smaller of said loops and having its central hole fitted to said eyelet-collar, substantially as hereinbefore specified.

EDWARD J. BROOKS.

Witnesses:
JAS. L. EWIN,
GEO. M. WHITNEY.